(12) United States Patent
Nakamura et al.

(10) Patent No.: US 11,842,854 B2
(45) Date of Patent: Dec. 12, 2023

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventors: Tomoaki Nakamura, Takasaki (JP); Mikio Tahara, Takasaki (JP); Michio Oshima, Takasaki (JP); Hiroaki Uenishi, Takasaki (JP); Takehiko Kamobe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/563,474

(22) Filed: Dec. 28, 2021

(65) Prior Publication Data

US 2022/0122775 A1    Apr. 21, 2022

Related U.S. Application Data

(63) Continuation of application No. 16/178,314, filed on Nov. 1, 2018, now Pat. No. 11,244,788.

(30) Foreign Application Priority Data

Nov. 14, 2017   (JP) .................................. 2017-219431

(51) Int. Cl.
*H01G 4/232*     (2006.01)
*H01G 4/30*      (2006.01)
(Continued)

(52) U.S. Cl.
CPC .............. *H01G 4/232* (2013.01); *H01G 4/12* (2013.01); *H01G 4/30* (2013.01); *H01G 13/006* (2013.01)

(58) Field of Classification Search
CPC ........... H01G 4/228; H01G 4/232; H01G 4/30
See application file for complete search history.

(56) References Cited

U.S. PATENT DOCUMENTS

2003/0026059 A1   2/2003  Togashi
2003/0169556 A1   9/2003  Yokoyama et al.
(Continued)

FOREIGN PATENT DOCUMENTS

CN   102969155 A   3/2013
CN   106504892 A   3/2017
(Continued)

OTHER PUBLICATIONS

A First Office Action issued by the State Intellectual Property Office of China dated Apr. 13, 2021, for Chinese counterpart application No. 201811352495.9. (8 pages).
(Continued)

*Primary Examiner* — Eric W Thomas
(74) *Attorney, Agent, or Firm* — Law Office of Katsuhiro Arai

(57) ABSTRACT

A ceramic electronic device includes: a ceramic main body having a parallelepiped shape in which edges of first internal electrode layers are led out to a first edge face and edges of second internal electrode layer are led out to a second edge face facing the first edge face; and external electrodes respectively formed on the first edge face and the second edge face and extending to at least one side face of the ceramic main body, wherein a distance in a length direction between first conductive layers of the respective external electrodes on the at least one side face is shorter between locations corresponding to corner portions of the ceramic main body, respectively, than between center portions of the
(Continued)

first conductive layers of the respective external electrodes in a width direction orthogonal to the length direction on the at least one side face.

9 Claims, 7 Drawing Sheets

(51) Int. Cl.
*H01G 4/12* (2006.01)
*H01G 13/00* (2013.01)

(56) References Cited

U.S. PATENT DOCUMENTS

| | | |
|---|---|---|
| 2006/0126264 A1 | 6/2006 | Yoshii et al. |
| 2008/0297976 A1 | 12/2008 | Togashi et al. |
| 2008/0297977 A1 | 12/2008 | Togashi et al. |
| 2010/0202098 A1 | 8/2010 | Yanagida et al. |
| 2013/0050898 A1 | 2/2013 | Seo et al. |
| 2013/0182369 A1 | 7/2013 | Jeon et al. |
| 2014/0003014 A1 | 1/2014 | Hoshi et al. |
| 2015/0187498 A1 | 7/2015 | Uchida et al. |
| 2016/0049256 A1 | 2/2016 | Kitano et al. |
| 2016/0141103 A1 | 5/2016 | Hamanaka et al. |
| 2016/0196922 A1 | 7/2016 | Omori et al. |
| 2017/0069428 A1 | 3/2017 | Shimizu |
| 2018/0190435 A1 | 7/2018 | Kishi et al. |

FOREIGN PATENT DOCUMENTS

| | | | |
|---|---|---|---|
| JP | 2002280254 A | | 9/2002 |
| JP | 2005123407 A | | 5/2005 |
| JP | 2006173270 A | | 6/2006 |
| JP | 2006310700 A | | 11/2006 |
| JP | 2007281212 A | * | 10/2007 |
| JP | 2008300769 A | | 12/2008 |
| JP | 2010165910 A | | 7/2010 |
| JP | 2013048208 A | | 3/2013 |
| JP | 2013149936 A | | 8/2013 |
| JP | 2013165178 A | | 8/2013 |
| JP | 2014011210 A | | 1/2014 |
| JP | 2017050453 A | | 3/2017 |
| WO | 2015045625 A1 | | 4/2015 |

OTHER PUBLICATIONS

A Notice of Reasons for Refusal issued by the Japanese Patent Office, dated Oct. 5, 2021, for Japanese counterpart application No. 2017-219431. (3 pages).
A Second Office Action issued by the State Intellectual Property Office of China dated Nov. 15, 2021, for Chinese counterpart application No. 201811352495.9. (6 pages).
Final Office Action issued by U.S. Patent and Trademark Office, dated Oct. 8, 2020, for U.S. Appl. No. 16/178,314 (12 pages).
Non-Final Office Action issued by U.S. Patent and Trademark Office, dated Mar. 18, 2021, for U.S. Appl. No. 16/178,314 (10 pages).
Non-Final Office Action issued by U.S. Patent and Trademark Office, dated May 7, 2020, for U.S. Appl. No. 16/178,314 (14 pages).
Notice of Allowance issued by U.S. Patent and Trademark Office, dated Oct. 1, 2021, for U.S. Appl. No. 16/178,314 (11 pages).
A Notice of Termination of Reconsideration of Amendment issued by the Japanese Patent Office, dated Feb. 14, 2023, for Japanese counterpart application No. 2017-219431. (1 page).
A Reconsideration Report issued by the Japanese Patent Office, dated Feb. 8, 2023, for Japanese counterpart application No. 2017-219431. (4 pages).
A Request for the Submission of an Opinion issued by Korean Intellectual Property Office dated Oct. 9, 2022, for Korean counterpart application No. 10-2018-0133331 (4 pages).
A Decision of Dismissal of Amendment issued by the Japanese Patent Office, dated Sep. 6, 2022, for Japanese counterpart application No. 2017-219431. (4 pages).
A Decision of Refusal issued by the Japanese Patent Office, dated Sep. 6, 2022, for Japanese counterpart application No. 2017-219431. (1 page).
A Notice of Reasons for Refusal issued by the Japanese Patent Office, dated Mar. 8, 2022, for Japanese counterpart application No. 2017-219431. (4 pages).
A Notice of Final Rejection issued by Korean Intellectual Property Office dated Apr. 10, 2023, for Korean counterpart application No. 10-2018-0133331 (4 pages).

* cited by examiner

CERAMIC ELECTRONIC DEVICE AND MANUFACTURING METHOD OF CERAMIC ELECTRONIC DEVICE

CROSS-REFERENCE TO RELATED APPLICATION

This application is a continuation of U.S. patent application Ser. No. 16/178,314, filed Nov. 1, 2018, which is based upon and claims the benefit of priority of the prior Japanese Patent Application No. 2017-219431, filed on Nov. 14, 2017, each disclosure of which is herein incorporated by reference in its entirety. The applicant herein explicitly rescinds and retracts any prior disclaimers or disavowals or any amendment/statement otherwise limiting claim scope made in any parent, child or related prosecution history with regard to any subject matter supported by the present application.

FIELD

A certain aspect of the present invention relates to a ceramic electronic device and a manufacturing method of a ceramic electronic device.

BACKGROUND

There is disclosed a technology in which a shape of an external electrode of a ceramic electronic device such as a multilayer ceramic capacitor is controlled for the purpose of improving thermal shock residence or reducing variation of electrostatic capacity (for example, see Japanese Patent Application No. 2006-173270 and Japanese Patent Application No. 2013-165178).

SUMMARY OF THE INVENTION

However, When the external electrode has the shape disclosed in Japanese Patent Application No. 2006-173270 and Japanese Patent Application No. 2013-165178, high humidity resistance may not be necessarily achieved.

The present invention has a purpose of providing a ceramic electronic device and a manufacturing a ceramic electronic device that are capable of achieving high humidity resistance.

According to an aspect of the present invention, there is provided a ceramic electronic device including: a ceramic main body that has internal electrode layers inside thereof and has a parallelepiped shape in which a part of one of the internal electrode layers is extracted to a first edge face of the parallelepiped shape and a part of another internal electrode layer is extracted to a second edge face of the parallelepiped shape facing the first edge face; external electrodes that are respectively formed on the first edge face and the second edge face and extend to at least one of side faces of the ceramic main body, wherein an interval between side edge portions of the external electrodes on the at least one of side faces is shorter than center portions of the external electrodes on the at least one of side faces.

According to another aspect of the present invention, there is provided a manufacturing method of a ceramic electronic device having internal electrode layers inside thereof and having a parallelepiped shape in which a part of one of the internal electrode layers is extracted to a first edge face of the parallelepiped shape and a part of another internal electrode layer is extracted to a second edge face of the parallelepiped shape facing the first edge face, including: forming external electrodes respectively on the first edge face and the second edge face to at least one of side faces of the ceramic main body, wherein an interval between side edge portions of the external electrodes on the at least one of side faces is shorter than center portions of the external electrodes on the at least one of side faces.

DETAILED DESCRIPTION

A description will be given of an embodiment with reference to the accompanying drawings.

Embodiment

Figure 1:
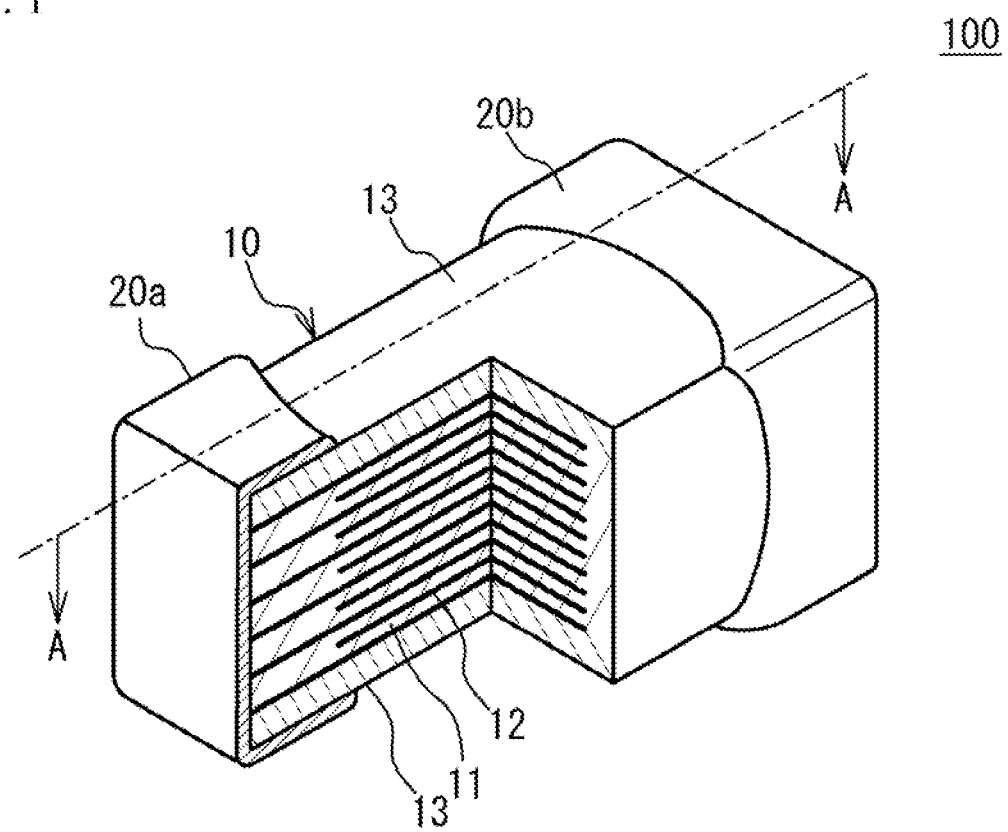
FIG. 1 illustrates a partial perspective view of a multilayer ceramic capacitor.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip (ceramic main body) 10 having a rectangular parallelepiped shape, and a pair of external electrodes 20a and 20b that are respectively provided at two edge faces of the multilayer chip 10 facing each other. Four faces other than the two edge faces of the multilayer chip 10 are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, cover layers 13 cover two of the four side faces that correspond to an upper face and a lower face in a stacking direction of the dielectric layers 11 and the internal electrode layers 12 (hereinafter referred to as a stacking direction). A main component of the cover layer 13 is a ceramic material.

For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1, 0 \leq y \leq 1, 0 \leq z \leq 1$) having a perovskite structure.

Figure 2:
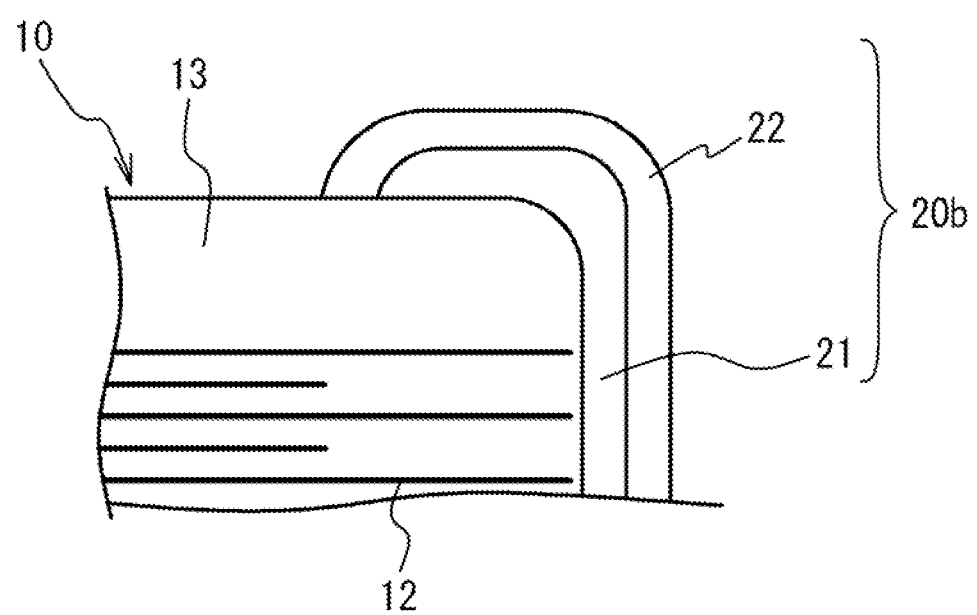
FIG. 2 illustrates a partial cross sectional view of an external electrode that is taken along a line A-A of FIG. 1.

FIG. 2 illustrates a cross sectional view of the external electrode 20b and is a cross sectional view taken along a line A-A of FIG. 1. In FIG. 2, hatching for cross section is omitted. On a surface of the multilayer chip 10, a ceramic material is mainly exposed. Therefore, it is difficult to form a plated layer on the surface of the multilayer chip 10 without a ground layer. And so, as illustrated in FIG. 2, the external electrode 20b has a structure in which a plated layer 22 is formed on a ground layer 21 formed on the surface of the multilayer chip 10.

A main component of the ground layer 21 is a metal such as Cu, Ni, Al (aluminum) or Zn (zinc). Alternatively the main component of the ground layer 21 is an alloy of the metals (for example, an alloy of Cu and Ni). The ground layer 21 includes a glass component for densifying the ground layer 21 or a co-material for controlling sinterability of the ground layer 21. The glass is an oxide of Ba (barium), Sr (strontium), Ca (calcium), Zn, Al, Si (silicon), B (boron) or the like. The co-material is a ceramic component of which a main component is the same as that of the dielectric layers 11.

A main component of the plated layer 22 is a metal such as Cu, Ni, Al, Zn, Sn (tin) or an alloy of them. The plated layer 22 may be a plated layer of a single metal component or may include a plurality of plated layers having a different metal. For example, the plated layer 22 has a structure in which a first plated layer 23, a second plated layer 24 and a third plated layer 25 are formed on the ground layer 21 in this order. The ground layer 21 and the plated layer 22 cover both of the edge faces of the multilayer chip 10 and extend to at least one of the four side faces of the multilayer chip 10. In the embodiment, the ground layer 21 and the plated layer 22 extend to the four side faces from both of the edge faces of the multilayer chip 10. The external electrode 20a has the same structure as the external electrode 20b.

Figure 3:
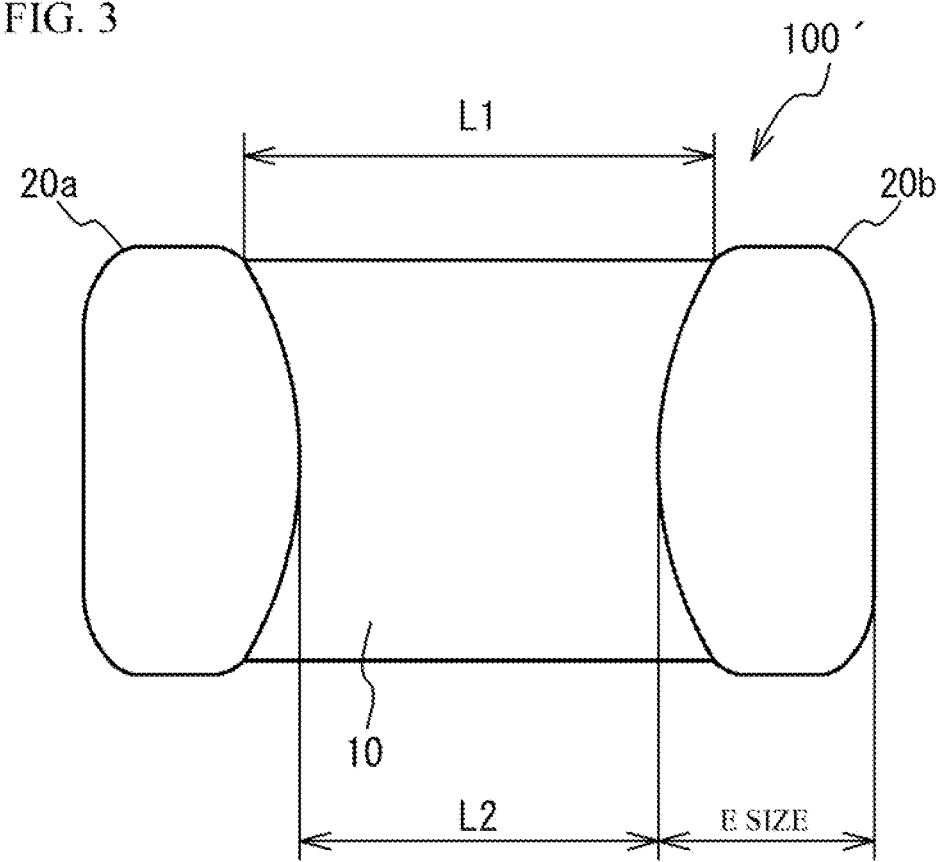
FIG. 3 illustrates an example of a shape of an external electrode.

It is possible to form the ground layer 21 by coating a conductive metal paste on the two edge faces of the fired multilayer chip 10 by a dipping method and by baking the conductive metal paste. In a case where the conductive metal paste is coated on the multilayer chip 10 by the dipping method, the multilayer chip 10 is dipped into the conductive metal paste so that the conductive metal paste has a predetermined electrode width (E size). It is predicted that water or flux permeates through a corner portion (edge part) of the multilayer chip 10 in which the thickness of the external electrode 20a or 20b is the smallest. It is therefore preferable that the conductive metal paste is thickly coated on the edge part of the multilayer chip 10. However, it is difficult to thickly coat the conductive paste on the edge part of the multilayer chip 10. When an interval L1 between side edge portions of the external electrodes 20a and 20b on the side faces is larger than an interval L2 between center portions of the external electrodes 20a and 20b as illustrated in FIG. 3 because of viscosity of the conductive metal paste, wettability of the surface of the multilayer chip 10, a surface tension and so on, the humidity resistance of the multilayer ceramic capacitor 100 may be degraded. In a multilayer ceramic capacitor 100' illustrated in FIG. 3, a part of the external electrode 20a on an edge part and a part of the external electrode 20b on another edge part are short. Therefore, for example, when a load test of humidity resistance of the multilayer chip 10 is performed, the water soluble flux may permeate from the edge part, may reach the connection portion between the internal electrode layers 12 and the external electrodes 20a and 20b, and may degrade the insulating resistance. In particular, in a case where an interval between the two edge faces is 1 mm or less, the interval L1 gets larger when the smallest distance (an interval L2) between the external electrode 20a and the external electrode 20b is sufficiently secured. It is therefore difficult to sufficiently secure the length of the external electrodes 20a and 20. When the interval of the two edge faces is 1 mm or less, the influence is notably remarkable. The edge part is a region of the corner of the multilayer chip 10 and has a curvature.

Figure 4:
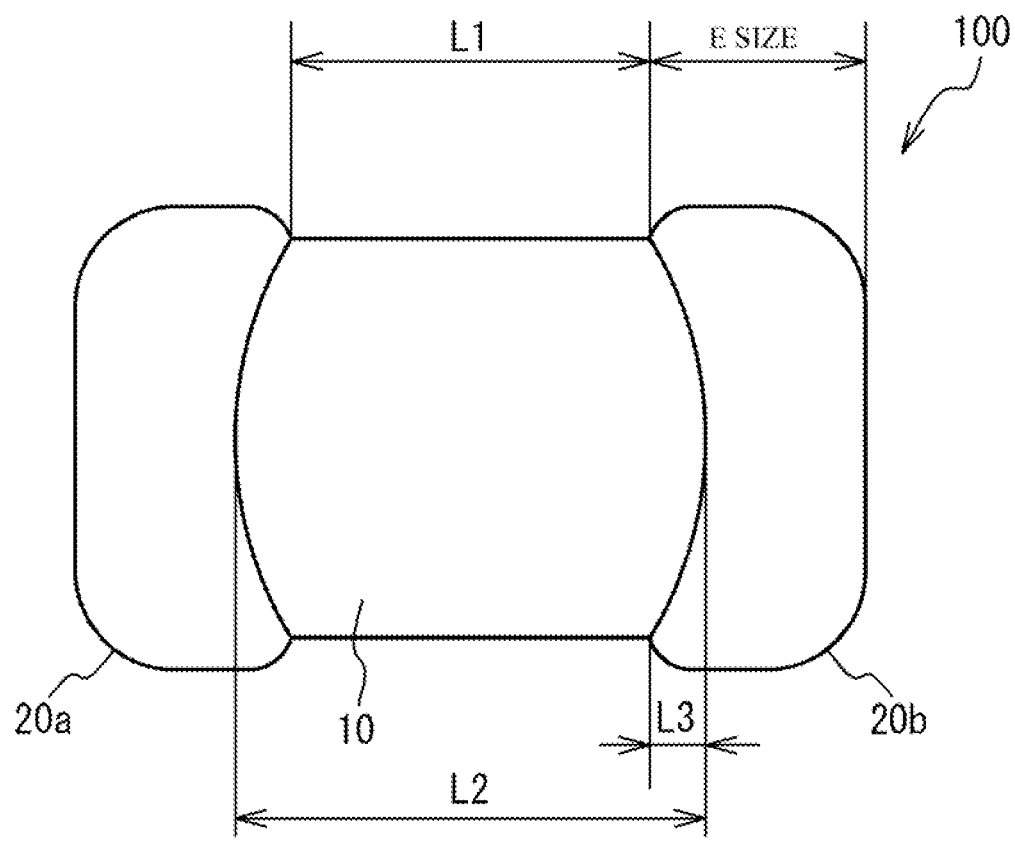
FIG. 4 illustrates an example of a shape of an external electrode of a multilayer ceramic capacitor of an embodiment.

And so, in the embodiment, as illustrated in FIG. 4, the interval L1 between the side edge portions of the external electrodes 20a and 20b on the side faces of the multilayer chip 10 is shorter than the interval L2 between the center portions. Thus, it is possible to elongate the parts of the external electrodes 20a and 20b on the edge parts. It is possible to suppress accessing of the water or the flux to the connection portion between the internal electrode layers 12 and the external electrodes 20a and 20b. It is therefore possible to improve the humidity resistance. When a distance between the side edge portions and the center portions (a portion closest to the edge face side) of the external electrodes 20a and 20b is L3, it is preferable that L3 (=(L2-L1)/2) is larger than 0 μm. In FIG. 1, the interval L1 of the side edge portions of the external electrodes 20a and 20b on the two side faces is shorter than the interval L2 between the center portions. Actually, the interval L1 of the side edge portions is shorter than the interval L2 between the center portions, on the side faces to which the external electrodes 20a and 20b extend (in the embodiment, on the four side faces).

In the multilayer ceramic capacitor 100' illustrated in FIG. 3, in a case where the interval between the two edge faces is 1 mm or less, when the smallest distance (the interval L2) between the external electrode 20a and the external electrode 20b is sufficiently secured, the interval L1 gets larger. It is therefore difficult to sufficiently secure the lengths of the parts of the external electrodes 20a and 20b on the edge parts. On the other hand, in the embodiment, even if the interval between the two edge faces is 1 mm or less, it is possible to sufficiently secure the smallest distance (the interval L1) between the external electrodes 20a and 20b and it is possible to sufficiently secure the lengths of the parts of the external electrodes 20a and 20b on the edge parts. And it is possible to improve the humidity resistance of the multilayer ceramic capacitor 100. Therefore, the embodiment has larger effect when the interval between the two edge faces on which the external electrodes 20a and 20b are provided is 1 mm or less.

In the embodiment, it is preferable that the thickness of the parts of the external electrodes 20a and 20b on the edge parts is 1 µm or more. In this case, the permeation of the water or the flux is suppressed. It is therefore possible to improve the humidity resistance of the multilayer ceramic capacitor 100. And it is possible to suppress occurrence of defect or breaking in the external electrodes 20a and 20b.

Moreover, in the embodiment, it is preferable that the parts of the external electrodes 20a and 20b on the side faces of the multilayer chip 10 is 10 µm or less. In this case, size enlargement of the multilayer ceramic capacitor 100 is suppressed.

The ground layer 21 of the external electrodes 20a and 20b having the above-mentioned shape is formed by reforming the surface of the fired multilayer chip 10, by coating the conductive metal paste on the two edge faces of the multilayer chip 10 and by baking the conductive metal paste.

Figure 5:
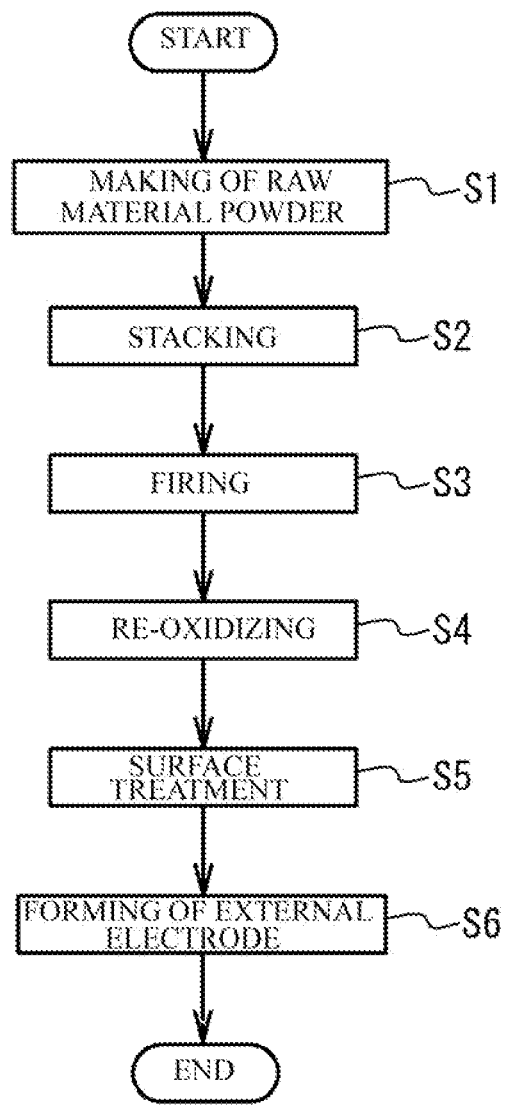
FIG. 5 illustrates a flowchart of a manufacturing method of a multilayer ceramic capacitor of an embodiment.

Next, a description will be given of a manufacturing method of the multilayer ceramic capacitor 100. FIG. 5 illustrates a manufacturing method of the multilayer ceramic capacitor 100.

(Making process of a raw material powder) Additive compound may be added to a ceramic powder material that is the main component of the dielectric layers 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass. Compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

(Stacking Process) Next, a binder such as polyvinyl butyral (PVB) resin, an organic solvent such as ethanol or toluene, and a plasticizer are added to the resulting ceramic material and are wet-blended. With use of the resulting slurry, a strip-shaped dielectric green sheet with a thickness of 0.8 µm or less is coated on a base material by, for example, a die coater method or a doctor blade method, and then dried.

Then, a pattern of the internal electrode layer 12 is provided on the surface of the dielectric green sheet by printing conductive pastes for forming an internal electrode with use of screen printing or gravure printing. The conductive pastes include powders of a main component metal of the internal electrode layers 12, a binder, an solvent and additives if necessary. It is preferable that the binder and the solvent are different from those of the ceramic slurry. The ceramic material that is the main component of the dielectric layers 11 and acts as the co-material may be dispersed into the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets and are thermally compressed. The resulting compact is cut into a predetermined size (for example, 1.0 mm×0.5 mm). Thus, a ceramic multilayer structure having a parallelepiped shape is formed.

(Firing Process) The binder is removed from the ceramic multilayer structure in $N_2$ atmosphere of 250 degrees C. to 500 degrees C. The resulting ceramic multilayer structure is fired for 10 minutes to 2 hours in a reductive atmosphere in a temperature range of 1100 degrees C. to 1300 degrees C. Thus, each compound structuring the dielectric green sheet is sintered. And a grains of each compound grows. In this manner, the multilayer ceramic capacitor 100 having the multilayer chip 10 in which the sintered dielectric layers 11 and the internal electrode layers 12 are alternately stacked and the cover layers 13 formed as the outermost layers in the stacking direction is formed.

(Re-oxidizing process) After that, the sintered structure may be subjected to a re-oxidizing process in $N_2$ gas atmosphere in a temperature range of 600 degrees C. to 1000 degrees C.

(Surface treatment process) Next, the surface of the multilayer chip 10 is reformed. Thus, wettability of the surface of the multilayer chip 10 (contact angle with respect to water) is 100° or more. In concrete, the multilayer chip 10 is dipped into process liquid such as silicon-based parting agent or fluorine-based parting agent that is made in electrolytic bath having a desired concentration. After that, the resulting multilayer chip 10 is dehydrated and is subjected to a thermal treatment. When the processing liquid is silicon-based parting agent, the thermal treatment temperature is 150 degrees C. and the thermal treatment time is 30 minutes. When the processing liquid is fluorine-based parting agent, the thermal treatment temperature is 100 degrees C. and the thermal treatment time is 5 minutes. The contact angle with respect to water before reforming the surface of the multilayer chip 10 is generally 50° to 100°. However, the multilayer chip 10 of which the contact angle with respect to water is 100° or more is obtained by the surface treatment process. For example, when the surface treatment process is performed with use of the silicon-based parting agent, the contact angle of the surface of the multilayer chip 10 with respect to water is, for example, 108° or more. When the surface treatment is performed with use of the fluorine-based parting agent, the contact angle of the surface of the multilayer chip 10 with respect to water is, for example, 122°.

Figures 6A, 6B, 6C, 6D:
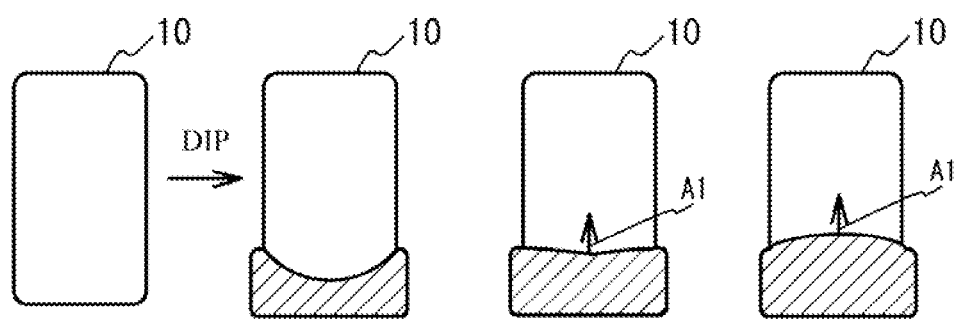
FIG. 6A to FIG. 6D illustrate a coating process of a conductive metal paste.

In a forming process of the external electrode described later, the multilayer chip 10 is dipped into a conductive metal paste, and the conductive metal paste is coated on the multilayer chip 10. In this case, as illustrated in FIG. 6B, in the beginning, the conductive metal paste (illustrated with hatching) is coated on corner portions of the multilayer chip 10. After that, as indicated with an arrow A1 of FIG. 6C and FIG. 6D, a center portion of the multilayer chip 10 is gradually wetted. In this case, when the surface of the multilayer chip 10 is not easily wetted by the conductive metal paste (the contact angle of the multilayer chip 10 with respect to water is large), it is difficult for the conductive metal paste to sufficiently crawl up. Therefore, when the contact angle of the surface of the multilayer chip 10 with respect to water is 100° or more, the interval L1 between the side edge portions of the external electrodes 20a and 20b is shorter than the interval L2 of the center portions of the external electrodes 20a and 20b.

(Forming process of external electrode) Next, the external electrodes 20a and 20b are formed on the multilayer chip 10.

The edge faces of the multilayer chip 10 are dipped into the conductive metal paste including metal filler, glass frit, binder and solvent. After that, the multilayer chip 10 is lifted up. Thus, the conductive metal paste is coated on the both edge faces of the multilayer chip 10 and is dried. In this case, at least one of a viscosity of the conductive metal paste, a thixotropic ratio of the conductive metal paste and a time for dipping the multilayer chip 10 into the conductive metal paste is changed in accordance with a desirable value of L3.

When the viscosity of the conductive metal paste is enlarged, it is possible to enlarge the distance L3 (=(L2−L1)/2 illustrated in FIG. 4). For example, it is possible to enlarge the viscosity of the conductive metal paste to 25 [Pa·s] or more. It is preferable that the viscosity of the conductive metal paste is 60 [Pa·s] or more. It is more preferable that the viscosity of the conductive metal is 100 [Pa·s] or more.

As mentioned above, when the conductive metal paste is coated on the multilayer chip 10, the conductive metal paste is coated on the corner portion of the multilayer chip 10 in the beginning as illustrated in FIG. 6B. After that, the center portion of the multilayer chip 10 is gradually wetted as illustrated in FIG. 6C and FIG. 6D. In this case, when the viscosity of the conductive metal paste is high and it is not easy for the conductive metal paste to crawl up, it is difficult for the conductive metal paste to sufficiently crawl up. Therefore, the larger the viscosity of the conductive metal paste is, the larger the distance L3 is.

The larger the thixotropic ratio is, the larger the distance L3 (=(L2−L1)/2 illustrated in FIG. 4) is. For example, when the viscosity of the conductive metal paste is 60 [Pa·s], it is possible to enlarge the thixotropic ratio to 3.1 or more. It is preferable that the thixotropic ratio is 5.4 or more.

As mentioned above, when the conductive metal paste is coated on the multilayer chip 10, the conductive metal paste is coated on the corner portions of the multilayer chip 10 in the beginning as illustrated in FIG. 6B. After that, the center portion of the multilayer chip 10 is gradually wetted as illustrated in FIG. 6C and FIG. 6D. A shearing velocity of the crawling is small. Therefore, when the viscosity of a low shearing velocity range is high (the thixotropic ratio is high), it is difficult for the conductive metal paste to sufficiently crawl up. Therefore, the larger the thixotropic ratio is, the larger the distance L3 is.

When the time for dipping the multilayer chip 10 into the conductive metal paste is shortened, it is possible to enlarge the distance L3 (=(L2−L1)/2 illustrated in FIG. 4). For example, when the viscosity of the conductive metal paste is 60 [Pa·s], it is possible to enlarge a speed for dipping the multilayer chip 10 into the conductive metal paste (dipping speed) to 250 [μm/sec] or more. It is preferable that the dipping speed is 2000 [μm/sec] or more. It is more preferable that the dipping speed is 10000 [μm/sec] or more.

As mentioned above, when the conductive metal paste is coated on the multilayer chip 10, the conductive metal paste is coated on the corner portions of the multilayer chip 10 in the beginning as illustrated in FIG. 6B. After that, the center portion of the multilayer chip 10 is gradually wetted as illustrated in FIG. 6C and FIG. 6D. In this case, when the time for crawling of the conductive metal paste is short, that is, when the dipping time of the multilayer chip 10 into the conductive metal paste is short, it is difficult for the conductive metal paste to sufficiently crawl up. Therefore, the shorter the dipping time of the multilayer chip 10 into the conductive metal paste is, the larger the distance L3 is.

After that, the conductive metal paste is baked. Thus, the ground layer 21 is formed. The binder and the solvent are vaporized by the baking.

After that, for the purpose of suppressing solder erosion during mounting on a substrate or improving wettability with respect to solder, the plated layer 22 is formed in the multilayer ceramic capacitor 100 by plating. With the processes, the multilayer ceramic capacitor 100 is manufactured.

In the manufacturing method, the interval L1 between the side edge portions on the side faces of the external electrodes 20a and 20b provided on the two facing edge faces is shorter than the interval L2 between the center portions. Thus, the external electrodes 20a and 20b on the edge parts are elongated. Thus, it is possible to elongate the distance between the edge portions of the external electrodes 20a and 20b on the edge parts to the connection portion between the internal electrode layers 12 and the external electrodes 20a and 20b. It is therefore possible to suppress permeation of the water and the flux from the edge part to the connection portion. Thus, it is possible to improve the humidity resistance of the multilayer ceramic capacitor 100.

In the manufacturing method, it is possible to form the ground layer 21 having an adequate thickness on a peripheral surface and secure the thickness of the parts of the ground layer 21 on the edge parts, when at least one of the contact angle of the surface of the multilayer chip 10 with respect to water, the dipping speed of the multilayer chip 10, the paste viscosity of the conductive metal paste, and the thixotropic ratio of the conductive metal paste is adjusted. Therefore, the thickness of the external electrodes 20a and 20b can be 1 μm or more. It is therefore possible to improve the humidity resistance of the multilayer ceramic capacitor 100. It is possible to suppress occurrence of the defect or breaking in the external electrodes 20a and 20b.

In the manufacturing method, it is possible to form the ground layer 21 having an adequate thickness on the peripheral surface and secure the thickness of the parts of the ground layer 21 on the edge parts, when at least one of the contact angle of the surface of the multilayer chip 10 with respect to water, the dipping speed of the multilayer chip 10, the paste viscosity of the conductive metal paste, and the thixotropic ratio of the conductive metal paste is adjusted. Therefore, the thickness of the ground layer 21 on the peripheral surface of the multilayer chip 10 can be 8 μm or less. Therefore, the thickness of the external electrodes 20a and 20b on the side faces of the multilayer chip 10 can be 10 μm or less. It is therefore possible to suppress the size enlargement of the multilayer ceramic capacitor 100.

In the manufacturing method, the viscosity of the conductive metal paste may be adjusted without the surface treatment process (without reforming the surface of the multilayer chip 10) so that the interval L1 between the side edge portions on the side faces of the external electrodes 20a and 20b provided on the two facing edge faces is shorter than the interval L2 between the center portions. In this case, the ground layer 21 on the peripheral surface of the multilayer chip 10 may get larger and the size of the multilayer ceramic capacitor may be enlarged. It is therefore preferable that the surface of the multilayer chip 10 may be reformed by the surface treatment process.

In the embodiments, the multilayer ceramic capacitor is described as an example of ceramic electronic devices.

However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Examples 1 to 3 and Comparative Examples 1 and 2

The multilayer chip 10 fired without forming the external electrodes was prepared. The size of the multilayer chip 10 was the length of 0.6 mm, the width of 0.3 mm and the height of 0.3 mm. The interval between the two edge faces on which the external electrodes 20a and 20b are formed was 1 mm or less.

In the example 1, water was used as the solvent. The multilayer chip 10 was dipped into the silicon-based parting agent that was made in electrolytic bath having 0.10 weight % concentration. After that, the resulting multilayer chip 10 was dehydrated and was subjected to a thermal treatment of 150 degrees C. for 30 minutes. Thus, the surface of the multilayer chip 10 was reformed. In the example 2, water was used as the solvent. The multilayer chip 10 was dipped into the fluorine-based parting agent that was made in electrolytic bath having 1 weight % concentration. After that, the resulting multilayer chip 10 was dehydrated and was subjected to a thermal treatment of 100 degrees C. for 5 minutes. Thus, the surface of the multilayer chip 10 was reformed. In the example 3 and the comparative examples 1 and 2, the surface treatment process was not performed.

Next, the conductive metal paste including the Cu filler, the glass frit, the binder and the solvent was coated on the both edge faces of the multilayer chip 10 and was dried. After that, the conductive metal paste was baked. Thus, the ground layer 21 was formed. The binder and the solvent were vaporized by the baking. In the examples 1 and 2, the viscosity of the conductive metal paste was 60 [Pa·s]. In the example 3, the viscosity of the conductive metal paste was 100 [Pa·s]. In the comparative example 1, the viscosity of the conductive metal paste was 25 [Pa·s]. In the comparative example 2, the viscosity of the conductive metal paste was 50 [Pa·s]. In the examples 1 to 3 and the comparative examples 1 and 2, the dipping speed for dipping the multilayer chip 10 into the conductive metal paste was 250 [μm/sec]. The time for remaining the multilayer chip 10 in the conductive metal paste was 0 second. The lifting speed of the multilayer chip 10 from the conductive metal paste was 1000 [μm/sec]. 1000 samples were made with respect to each of the examples 1 to 3 and the comparative examples 1 and 2.

Figure 7A:
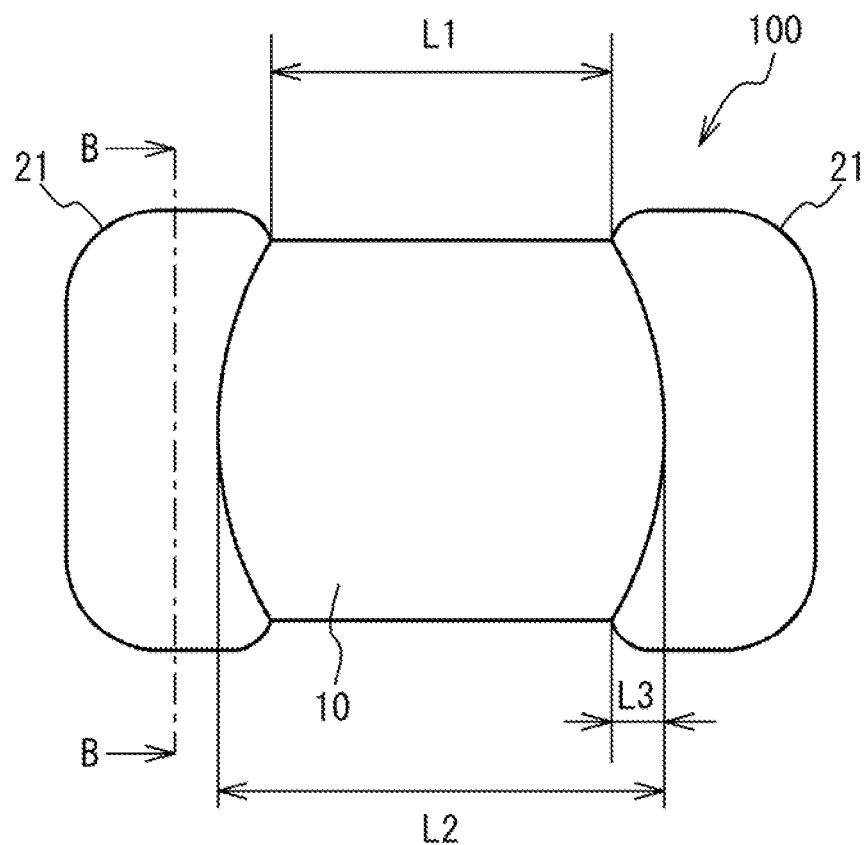
FIG. 7A and FIG. 7B illustrate a size of each part of a ground layer.
Figure 7B:
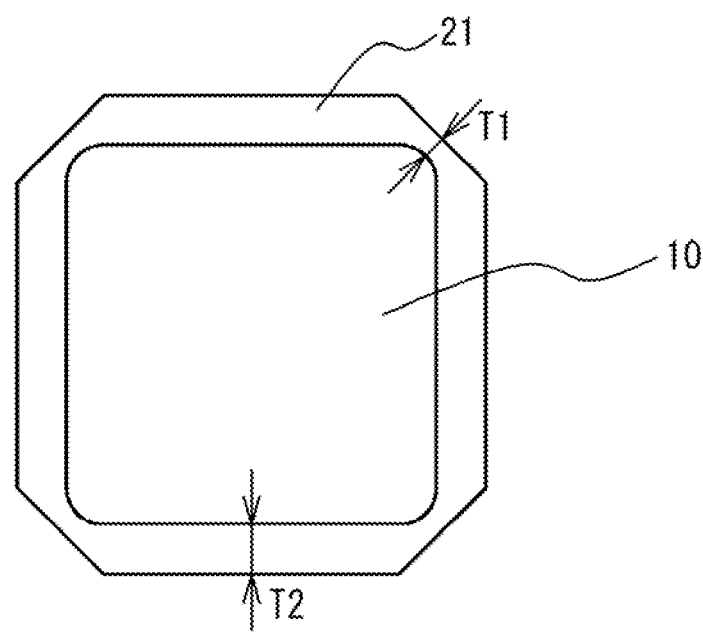

(Analysis) The distance L3 illustrated in FIG. 7A, the thickness T1 of the ground layer 21 on the corner portion (edge part) of the multilayer chip 10 illustrated in FIG. 7B, and the thickness T2 of the ground layer 21 on the peripheral surface were measured with respect to each sample of the examples 1 to 3 and the comparative examples 1 and 2. FIG. 7B illustrates a cross sectional view taken along a line B-B of FIG. 7B and a cross sectional view corresponding to the edge face of the multilayer chip 10. In FIG. 7A, hatching is omitted.

With respect to each sample of the examples 1 to 3 and the comparative examples 1 and 2, it was confirmed whether the defect or the breaking was occurred in the ground layer 21. Moreover, a reliability test was performed. In the reliability test, a withstand voltage test was performed under a condition that the temperature was 85 degrees C., the relative humidity was 85%, the voltage was 10V and the time of the withstand voltage test was 1000 h. In this case, the number of abnormal samples of which the resistance was 100 MΩ less for 60 seconds was measured.

Table 1 shows the condition of the ground layer 21 and results of the reliability test. In Table 1, when L3 was minus value, the interval L2 between the center portions on the side faces of the external electrodes 20a and 20b was shorter than the interval L1 between the side edge portions.

TABLE 1

| | COMPARATIVE EXAMPLE 1 | COMPARATIVE EXAMPLE 2 | EXAMPLE 1 | EXAMPLE 2 | EXAMPLE 3 |
|---|---|---|---|---|---|
| SURFACE TREATMENT | NO | NO | SILICON-BASED PARTING AGENT | FLUORINE-BASED PARTING AGENT | NO |
| PASTE VISCOSITY [Pa · s] | 25 | 50 | 60 | 60 | 100 |
| CONTACT ANGLE [°] | 90 | 90 | 108 | 120 | 90 |
| L3 [μm] | −10 | −5 | 15 | 30 | 5 |
| THICKNESS T1 OF CORNER PORTION [μm] | 0.7 | 0.9 | 1.5 | 1.8 | 1.2 |
| THICKNESS T2 OF PERIPHERAL SURFACE [μm] | 6.2 | 7.5 | 7.8 | 7.6 | 9.3 |
| RELIABILTY TEST | 2/1000 | 1/1000 | 0/1000 | 0/1000 | 0/1000 |
| DEFECT/ BREAKING | 5/1000 | 2/1000 | 0/1000 | 0/1000 | 0/1000 |

As shown in Table 1, in the comparative examples 1 and 2, the number of abnormal samples was 2 and 1 in the reliability test. It is thought that this was because the ground layer 21 on the edge part was short as illustrated in FIG. 3.

On the other hand, in any of examples 1 to 3, the number of the abnormal sample was zero in the reliability test. It is thought that this was because the ground layer 21 had the shape illustrated in FIG. 7A, and the part of the ground layer 21 on the edge part was long, in the examples 1 to 3. And, it is thought that the humidity resistance was improved because the thickness of the part of the ground layer 21 on the edge part was 1 μm or more.

In the comparative examples 1 and 2, the number of the sample in which the defect or the breaking was occurred in the ground layer 21 was 5 and 2. On the other hand, in any of examples 1 to 3, neither the defect nor the breaking was occurred in the ground layer 21. It is thought that the thickness T1 of the corner portion that was easily subjected to shock was 1 μm or more and was larger than those of the comparative examples 1 and 2 because the contact angle of the surface of the multilayer chip 10 with respect to water and the paste viscosity of the conductive metal paste were adjusted.

In the example 3, neither the defect nor the breaking was occurred in the ground layer 21 and the number of the abnormal sample was zero in the reliability test, as well as the examples 1 and 2. However, the thickness T2 of the ground layer 21 on the peripheral surface was larger than those of the examples 1 and 2. Therefore, the size of the multilayer ceramic capacitor may be enlarged. On other hand, in any of examples 1 and 2, the thickness T2 of the ground layer 21 on the peripheral surface was 8 μm or less. Therefore, even if the plated layer 22 is formed on the ground layer 21, the thickness of the whole of the external electrodes 20a and 20b can be 10 μm or less. And it is possible to suppress the size enlargement of the multilayer ceramic capacitor. Accordingly, it is possible to control the shape of the ground layer 21 by adjusting the viscosity of the conductive metal paste, as in the case of the example 3. However, it was confirmed that the controlling of the shape of the ground layer 21 by controlling the wettability of the surface of the multilayer chip 10 (the contact angle with respect to water) through the surface treatment process is more preferable.

Examples 4 to 6

The viscosity of the conductive metal paste or the thixotropic ratio ware changed, and the ground layer 21 was formed. In the example 4, the viscosity of the conductive metal paste was 25 [Pa·s]. In the example 5, the viscosity of the conductive metal paste was 100 [Pa·s]. In the example 6, the viscosity of the conductive metal paste was 60 [Pa·s], and the thixotropic ratio was 5.4. In the examples 4 to 6, a multilayer chip which was subjected to the surface treatment process with use of the silicon-based parting agent was used as the multilayer chip 10. The dipping speed for dipping the multilayer chip 10 into the conductive metal paste was 250 [μm/sec]. The time for remaining the multilayer chip 10 in the conductive metal paste was 0 second. And the lifting speed for lifting the multilayer chip 10 from the conductive metal paste was 1000 [μm/sec].

Table 2 shows the distance L3 of each sample of the example 1 and the examples 4 to 6. The thixotropic ratio of 1 T corresponds to the shearing velocity of 0.4 [l/s]. The thixotropic ratio of 100 T corresponds to the shearing velocity of 40 [l/s].

TABLE 2

|  | EXAMPLE 1 | EXAMPLE 4 | EXAMPLE 5 | EXAMPLE 6 |
| --- | --- | --- | --- | --- |
| SURFACE TREATMENT | SILICON-BASED PARTING AGENT | SILICON-BASED PARTING AGENT | SILICON-BASED PARTING AGENT | SILICON-BASED PARTING AGENT |
| PASTE VISCOSITY [Pa · s] | 60 | 25 | 100 | 60 |
| THIXOTROPIC RATIO (1T/100T) | 3.1 | 2.9 | 3.2 | 5.4 |
| DIPPING SPEED [μm/sec] | 250 | 250 | 250 | 250 |
| REMAINING TIME [sec] | 0 | 0 | 0 | 0 |
| LIFTING SPEED [μm/sec] | 1000 | 1000 | 1000 | 1000 |
| L3 [μm] | 15 | 5 | 23 | 17 |

As shown in Table 2, it was confirmed that when the viscosity of the conductive metal paste was enlarged, the distance L3 was enlarged. On the basis of the comparison between the example 1 and the example 6, it was confirmed that when the thixotropic ratio was enlarged, the distance L3 was enlarged. That is, it was confirmed that it is possible to control the distance L3 by changing at least one of the paste viscosity and the thixotropic ratio.

Examples 7 and 8

The dipping speed for dipping the multilayer chip 10 into the conductive metal paste was changed, and the ground layer 21 was formed. In the example 7, the dipping speed for dipping the multilayer chip 10 into the conductive metal paste was 2000 [μm/sec]. In the example 8, the dipping speed for dipping the multilayer chip 10 into the conductive metal paste was 10000 [μm/sec]. In the examples 7 to 8, a multilayer chip which was subjected to the surface treatment process with use of the silicon-based parting agent was used as the multilayer chip 10. The conductive metal paste was the same as that of the example 1.

Table 3 shows the distance L3 of each sample of the example 1 and the examples 7 and 8.

TABLE 3

|  | EXAMPLE 1 | EXAMPLE 7 | EXAMPLE 8 |
|---|---|---|---|
| SURFACE TREATMENT | SILICON-BASED PARTING AGENT | SILICON-BASED PARTING AGENT | SILICON-BASED PARTING AGENT |
| PASTE VISCOSITY [Pa · s] | 60 | 60 | 60 |
| DIPPING SPEED [μm/sec] | 250 | 2000 | 10000 |
| REMAINING TIME [sec] | 0 | 0 | 0 |
| LIFTING SPEED [μm/sec] | 1000 | 1000 | 1000 |
| L3 [μm] | 15 | 15 | 17 |

As shown in Table 3, it was confirmed that when the dipping speed for dipping the multilayer chip 10 into the conductive metal paste was enlarged, that is, when the time for dipping the multilayer chip 10 in the conductive metal paste was shorter, the distance 13 was enlarged. That is, it was confirmed that the distance L3 was controllable when the dipping speed for dipping the multilayer chip 10 into the conductive paste was adequately changed. The time for dipping the multilayer chip 10 in the conductive metal paste may be shortened by changing (enlarging) the lifting speed for lifting the multilayer chip 10 from the conductive metal paste together with changing the dipping speed, instead of the dipping speed.

Although the embodiments of the present invention have been described in detail, it is to be understood that the various change, substitutions, and alterations could be made hereto without departing from the spirit and scope of the invention.

What is claimed is:

1. A ceramic electronic device comprising:
a ceramic main body that has internal electrode layers inside thereof and has a parallelepiped shape in which a part of one of the internal electrode layers is extracted to a first edge face of the parallelepiped shape and a part of another internal electrode layer is extracted to a second edge face of the parallelepiped shape facing the first edge face;
external electrodes that are respectively formed on the first edge face and the second edge face and extend in a length direction to at least one of four side faces of the ceramic main body, each of the external electrodes being constructed of one or more conductive layers,
wherein a distance in the length direction between first conductive layers of the respective external electrodes on the at least one of the side faces is shorter between locations corresponding to corner portions of the ceramic main body, respectively, than between center portions of the first conductive layers of the respective external electrodes in a width direction orthogonal to the length direction on the at least one of the side faces, the first conductive layers of the external electrodes being layers that are respectively in direct contact with the first edge face and the second edge face and extend in the length direction to the at least one of the side faces, each of said corner portions of the ceramic main body being a ridge region connecting the at least one of the side faces and another of the side faces adjacent to the at least one of the side faces and having a curvature as viewed in the length direction,
wherein each of the external electrodes has a thickness of 1 μm or more on the corner portion of the ceramic main body,
wherein each of the external electrodes has a thickness of 10 μm or less on the at least one of the side faces.

2. The ceramic electronic device as claimed in claim 1, wherein a distance between the first edge face and the second edge face is 1 mm or less.

3. The ceramic electronic device as claimed in claim 2, wherein (L2−L1)/2 is 5 μm or greater and 30 μm or less where L1 represents the distance in the length direction between the first conductive layers of the respective external electrodes on the at least one of the side faces between the locations corresponding to corner portions of the ceramic main body, respectively, and L2 represents the distance in the length direction between the first conductive layers of the respective external electrodes on the at least one of the side faces between the center portions of the first conductive layers of the respective external electrodes in the width direction on the at least one of the side faces.

4. The ceramic electronic device as claimed in claim 1, wherein the first conductive layers have a thickness of 8 μm or less.

5. The ceramic electronic device as claimed in claim 1, wherein the first conductive layers include a glass component or a ceramic component.

6. The ceramic electronic device as claimed in claim 1, each of the first conductive layers has a thickness of 1 μm or more on the corner portion of the ceramic main body.

7. A manufacturing method of a ceramic electronic device having internal electrode layers inside thereof and having a parallelepiped shape in which a part of one of the internal electrode layers is extracted to a first edge face of the parallelepiped shape and a part of another internal electrode layer is extracted to a second edge face of the parallelepiped shape facing the first edge face, comprising:
forming external electrodes respectively on the first edge face and the second edge face in a manner extending in a length direction to at least one of four side faces of the ceramic main body, each of the external electrodes being constructed of one or more conductive layers,
wherein a distance in the length direction between first conductive layers of the respective external electrodes on the at least one of the side faces is shorter between locations corresponding to corner portions of the ceramic main body, respectively, than between center portions of the first conductive layers of the respective external electrodes in a width direction orthogonal to the length direction on the at least one of the side faces, the first conductive layers of the external electrodes being layers that are respectively in direct contact with the first edge face and the second edge face and extend in the length direction to the at least one of the side faces, each of said corner portions of the ceramic main body being a ridge region connecting the at least one of the side faces and another of the side faces adjacent to the at least one of the side faces and having a curvature as viewed in the length direction,
wherein each of the external electrodes has a thickness of 1 μm or more on the corner portion of the ceramic main body,
wherein each of the external electrodes has a thickness of 10 μm or less on the at least one of the side faces.

8. The method as claimed in claim 7, wherein the forming of the external electrodes comprises:
- reforming a surface of the ceramic main body;
- coating a conductive metal paste on the ceramic main body after the reforming, by dipping the ceramic main boy after the reforming into a conductive metal paste;
- forming a ground layer by baking the conductive metal paste; and
- forming a plated layer on the ground layer.

9. The method as claimed in claim 8, wherein, in the reforming, the surface is reformed so that a contact angle of the surface of the ceramic body with respect to water is 100° or more.

* * * * *